United States Patent
Monge Nunez et al.

(10) Patent No.: US 10,885,755 B2
(45) Date of Patent: Jan. 5, 2021

(54) HEAT-BASED PATTERN RECOGNITION AND EVENT DETERMINATION FOR ADAPTIVE SURVEILLANCE CONTROL IN A SURVEILLANCE SYSTEM

(71) Applicant: INTERNATIONAL BUSINESS MACHINES CORPORATION, Armonk, NY (US)

(72) Inventors: Roxana Monge Nunez, Pérez Zeledón (CR); Shikhar Kwatra, Durham, NC (US); Franz F. Liebinger Portela, San Pablo de Heredia (CR); Edgar A. Zamora Duran, Heredia (CR); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/131,108

(22) Filed: Sep. 14, 2018

(65) Prior Publication Data
US 2020/0090477 A1 Mar. 19, 2020

(51) Int. Cl.
*H04N 7/18* (2006.01)
*G08B 13/191* (2006.01)
(Continued)

(52) U.S. Cl.
CPC ....... *G08B 13/191* (2013.01); *G06K 9/00536* (2013.01); *G08B 13/19608* (2013.01);
(Continued)

(58) Field of Classification Search
CPC .............. H04N 7/188; G08B 13/19608; G08B 13/19602; G08B 31/00; G08B 13/19641;
(Continued)

(56) References Cited

U.S. PATENT DOCUMENTS

| 6,476,859 | B1 | 11/2002 | Galloway et al. |
| 7,847,820 | B2 | 12/2010 | Vallone et al. |

(Continued)

FOREIGN PATENT DOCUMENTS

| EP | 2264643 A1 | 12/2010 |
| EP | 3088910 B1 | 2/2018 |
| WO | 2006135962 A1 | 12/2006 |
| WO | 2015001528 A1 | 1/2015 |
| WO | 2017206896 A1 | 12/2017 |

OTHER PUBLICATIONS

Grant, "These heat maps reveal where we feel love, anger, shame & sadness on our bodies", Venturebeat.com, Dec. 31, 2013, 4 pages, www.venturebeat.com/2013/12/31/these-heat-maps-reveal-where-we-feel-love-anger-shame-sadness-on-our-bodies/.
(Continued)

*Primary Examiner* — Peet Dhillon
(74) *Attorney, Agent, or Firm* — Caleb D. Wilkes

(57) ABSTRACT

A method for heat-based control of a surveillance system is provided. The method may include detecting a first pattern of heat transferred from a heat source based on a first sensor dataset corresponding to a first event, determining an expected pattern of heat to be transferred from the heat source during a second event based on the first pattern of heat transfer, and generating a surveillance model based on the expected pattern of heat transfer. The method may further include detecting a second pattern of heat transferred from the heat source based on a second sensor dataset corresponding to the second event, detecting the heat source during the second event with respect to the second pattern of heat transfer, and determining a threat level corresponding to a security risk posed by the heat source with respect to the environment.

20 Claims, 6 Drawing Sheets

(51) Int. Cl.
  *H04N 5/33* (2006.01)
  *G08B 13/196* (2006.01)
  *G08B 21/18* (2006.01)
  *G06K 9/00* (2006.01)
(52) U.S. Cl.
  CPC ............. *G08B 21/182* (2013.01); *H04N 5/33* (2013.01); *H04N 7/183* (2013.01)
(58) Field of Classification Search
  CPC ......... G08B 13/19613; G06K 9/00771; G06K 9/00; A61B 5/015; A61B 5/7264
  See application file for complete search history.

(56) References Cited

U.S. PATENT DOCUMENTS

| | | | |
|---|---|---|---|
| 2005/0173380 A1* | 8/2005 | Carbone | B23K 26/032 219/121.31 |
| 2017/0186291 A1* | 6/2017 | Wenus | G01S 3/786 |
| 2020/0054905 A1* | 2/2020 | Livchak | G08B 17/107 |

OTHER PUBLICATIONS

AIT, "Map Based Sensor Fusion for Security and Surveillance Systems", AIT Austrian Institute of Technology, 2 pages, Accessed on Sep. 13, 2018.

Wong et al., "Omnidirectional Thermal Imaging Surveillance System Featuring Trespasser and Faint Detection", International Journal of Image Processing (IJIP), Aug. 2, 2011, pp. 518-538, vol. (4), Issue (6).

Makantasis et al., "Data-Driven Background Subtraction Algorithm for in-Camera Acceleration in Thermal Imagery", IEEE Transactions on Circuits and Systems for Video Technology (Early Access), Jun. 2, 2017, 2 pages, IEEE.

Wong et al., "An Effective Surveillance System Using Thermal Camera", 2009 International Conference on Signal Acquisition and Processing, Apr. 3-5, 2009, 3 pages, Kuala Lumpur, Malaysia, https://ieeexplore.ieee.org/document/5163816/.

Mell et al., "The NIST Definition of Cloud Computing", Recommendations of the National Institute of Standards and Technology, Special Publication 800-145, Sep. 2011, 7 pages.

* cited by examiner

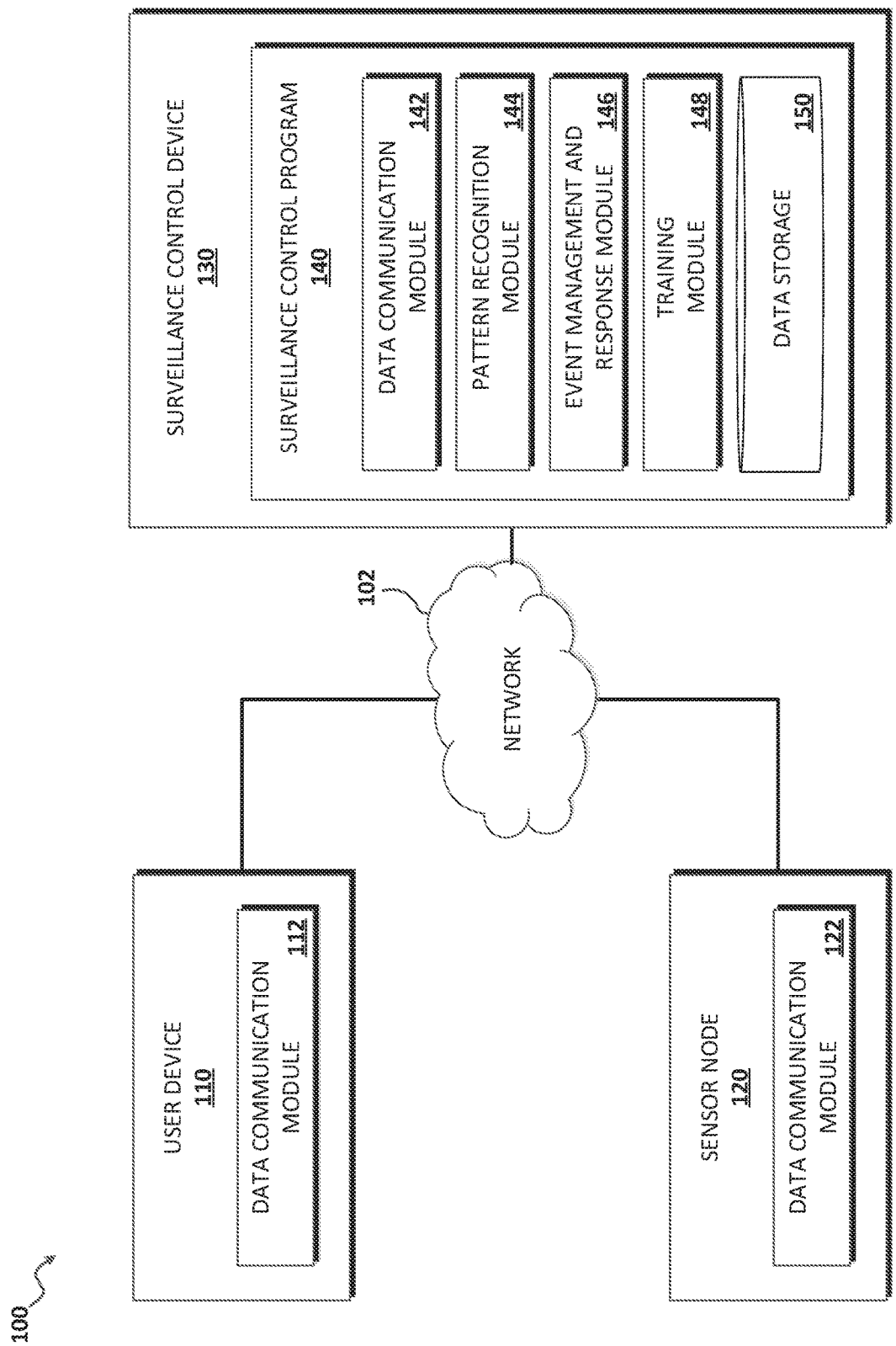

HEAT-BASED PATTERN RECOGNITION AND EVENT DETERMINATION FOR ADAPTIVE SURVEILLANCE CONTROL IN A SURVEILLANCE SYSTEM

BACKGROUND

The present invention relates to heat-based pattern recognition and event detection in an automated surveillance system, and in particular to a method of adaptive surveillance control for targeted, context-based event detection in a monitored environment.

Video surveillance systems are widely applied in various residential, commercial, governmental, and industrial settings. For example, a surveillance system including video cameras positioned in an environment may be implemented to monitor and secure the environment based on captured images and video footage (i.e. surveillance data) of people and objects in the environment. The surveillance data may be communicated as a feed or stream across a network to a central location for monitoring to detect unusual and suspicious activity in the environment.

SUMMARY

A computer-implemented method, computer system, and computer program product for heat-based control of a surveillance system is provided. In an aspect, the method may include detecting a first pattern of heat transferred from a heat source based on a first sensor dataset corresponding to a first event, determining an expected pattern of heat to be transferred from the heat source during a second event based on the first pattern of heat transfer, and generating a surveillance model based on the expected pattern of heat transfer. The method may further include detecting a second pattern of heat transferred from the heat source based on a second sensor dataset corresponding to the second event, detecting the heat source during the second event with respect to the second pattern of heat transfer, and determining a threat level corresponding to a security risk posed by the heat source with respect to the environment.

BRIEF DESCRIPTION OF THE DRAWINGS

FIG. 1 is a functional block diagram depicting a surveillance control system, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 2A:
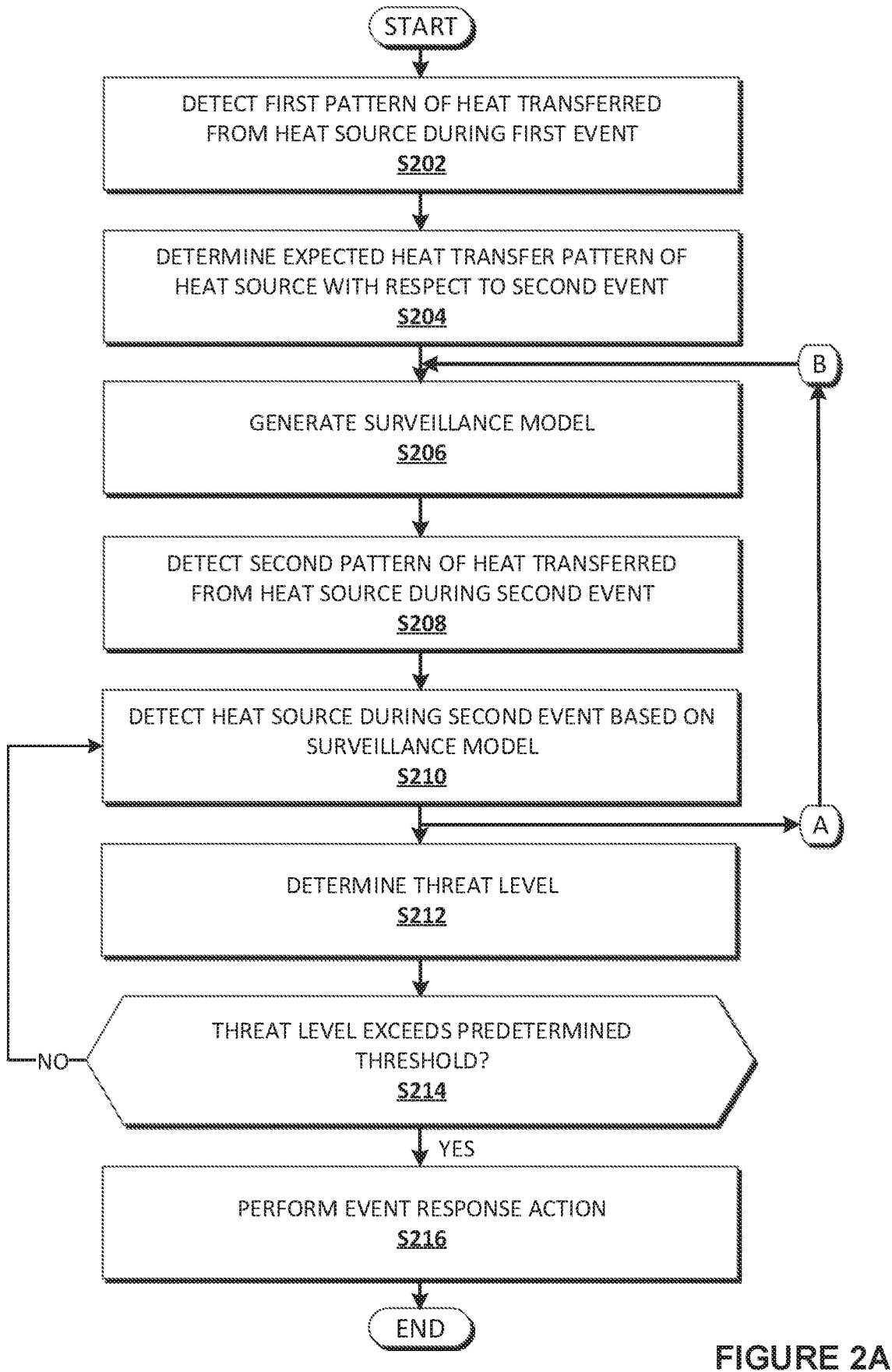
FIG. 2A is a flowchart depicting operational steps of an aspect of the surveillance control system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Video surveillance produces large amounts of surveillance data that often cannot be effectively monitored 24/7 by human operators. In one respect, active monitoring of a surveillance feed by a human operator is insufficient in real-time applications requiring immediate detection of events, such as time-sensitive events including security breaches and the like. In another, surveillance reliability may be subject to random variation such as caused by lack of operator presence for monitoring a feed to detect and respond to suspicious, undesired, or anomalous activities and events.

To assist in monitoring surveillance feeds, some surveillance systems may implement motion detection sensors in capturing and recording surveillance data based on detected motion. In particular, a surveillance system may implement data generated by a motion detection sensor to activate and automatically control camera operation (e.g. focusing, zooming, panning, etc.), such as to monitor an environment with respect to transiently occurring events corresponding to the generated data. For example, when motion is detected, such as by external sensor or video motion detection, a corresponding signal (e.g. surveillance data) may be generated and delivered to an automated monitoring system to trigger video recording, control camera operation, and if necessary, generate and communicate an alert to the proper authorities.

However, in complex surveillance systems that include numerous cameras for monitoring an area or environment, where a wide variety of possible activities and events may occur, the incorporation of motion detection alone may be insufficient for controlling camera operation to effectively monitor an environment, and may cause high false alarm rates due to varying environmental or contextual conditions.

Accordingly, there is a need in the art for a method of surveillance control in an automated surveillance system that enables effective monitoring of an environment and accurate event detection with an acceptable false alarm rate.

Embodiments of the present invention are directed to a method of adaptive surveillance control in an automated surveillance system for targeted, context-based event detection in a monitored environment. In an aspect, the present invention may control camera operation based on thermal image data to monitor and detect events of interest in the environment according to user-defined preferences and conditions. The method may implement a machine learning technique to adaptively detect the events as such may vary in occurrence with respect to contextual conditions in the environment over time. The method may implement a machine learning process to monitor the environment and detect the events according to varying conditions over time.

Advantageously, the present invention overcomes the aforementioned problems of the prior art by implementing a combination of sensor modalities, along with machine learning, in controlling camera operation to monitor and detect events and activities in an environment. In particular, the present invention achieves a greater degree of situational and contextual awareness of the environment by implementing infrared sensors and cameras to control camera operation (i.e. of one or more cameras operating in the visual-range) based on the occurrence of spatio-temporal heat transfer patterns in the environment. The camera operation may be controlled so as to track the detected heat transfer patterns in the environment. The machine learning may be implemented in adapting the control of the camera operation to monitor and detect changing and evolving events and activities in the environment. To that end, the present invention improves the effectiveness of automated surveillance systems by reducing false alarm rates, as the determination of what does and does not constitute an event or activity of interest in the monitored environment may be continuously adapted to remain relevant to changing conditions and parameters in the environment. Further, by implementing infrared sensors and cameras the present invention increases the accuracy and sensitivity of environment monitoring and event detection by automated surveillance systems by enabling monitoring and detection of events based on a wider range conditions and parameters, thereby increasing the accuracy of detected events and the reliability of the automated surveillance systems. Other advantages will become readily apparent to those of skill in the art based on the descriptions of the present invention herein.

For purposes of the present disclosure, a "monitored environment" refers to any environment or area surveilled by an image capture device (e.g. a surveillance camera) for the purpose of security.

Referring now to FIG. 1, a functional block diagram of surveillance control system 100 is depicted, in accordance with an embodiment of the present invention. Surveillance control system 100 may include user device 110, sensor node 120, and surveillance control device 130 interconnected over network 102. Surveillance control system 100 may further include an image capture device (not depicted), which may be used in a surveillance system to monitor an environment. While surveillance control system 100 is depicted in FIG. 1 as including three discrete devices, other arrangements may be contemplated. For example, surveillance control system 100 may include a plurality of user devices such as user device 110, and/or a plurality of sensor devices such as sensor node 120 (e.g. as in a sensor array). In various embodiments, user device 110, sensor node 120, and/or surveillance control device 130 may be formed by one or more integrated or distinct devices.

In various embodiments, network 102 may include an intranet, a local area network (LAN), a personal area network (PAN), a wireless local area network (WLAN), a wireless personal area network (WPAN), a wireless mesh network, a wide area network (WAN) such as the Internet, or the like. Network 102 may include wired, wireless, or fiber optic connections. Network 102 may otherwise include any combination of connections and protocols for supporting communications between user device 110, sensor node 120, and surveillance control device 130, in accordance with embodiments of the present invention.

In various embodiments, user device 110, sensor node 120, and/or surveillance control device 130 may include a computing platform or node such as a microcontroller, a microprocessor, a wearable device, an implantable device, a mobile or smart phone, a tablet computer, a laptop computer, a desktop computer, a server such as a database server, a virtual machine, or the like. User device 110, sensor node 120, and/or surveillance control device 130 may otherwise include any other type of computing platform, computer system, or information system capable of sending and receiving data to and from another device, such as by way of network 102. In certain embodiments, user device 110, sensor node 120, and/or surveillance control device 130 may include internal and external hardware components, as described with reference to FIG. 3. In other embodiments, user device 110, sensor node 120, and/or surveillance control device 130 may be implemented by way of a cloud computing environment, as described with reference to FIGS. 4 and 5.

User device 110 may host data communication module 112. User device 110 may implement a combination of devices and technologies such as network devices and device drivers to support the operation of data communication module 112, and to provide a platform enabling communications between user device 110, sensor node 120, and surveillance control device 130, in accordance with embodiments of the present invention.

Data communication module 112 may include an application or program such as a software program, one or more subroutines contained in a program, an application programming interface, or the like, to support communications between user device 110, sensor node 120, and surveillance control device 130, in accordance with embodiments of the present invention.

In an embodiment, user device 110 may receive user inputs from a user to generate user specification data for communication by data communication module 112 to surveillance control device 130 over network 102, for monitoring the monitored environment, accordingly. In the embodiment, the user specification data may correspond to one or more user-defined parameters including user preferences related to event monitoring rules, event detection rules, event response rules, and the like. In the embodiment, the user specification data may define environmental and contextual conditions with respect to patterns of heat transfer by which occurrences of events in the monitored environment may be detected, monitored, and responded to, accordingly.

Sensor node 120 may host data communication module 122. Sensor node 120 may implement a combination of devices and technologies such as network devices and device drivers, radio communication devices and control circuitry, or the like, to support the operation of data communication module 122, and to provide a platform enabling communications between user device 110, sensor node 120, and surveillance control device 130, in accordance with embodiments of the present invention.

Data communication module 122 may include electronic circuitry, an application or program such as a software program, one or more subroutines contained in a program, an application programming interface, or the like, to support communications between user device 110, sensor node 120, and surveillance control device 130, in accordance with embodiments of the present invention.

In an embodiment, sensor node 120 may include a thermal sensor. The thermal sensor may include, for example, a thermal imaging device such as an infrared (IR) camera, a thermal imaging camera, thermographic camera, and the like. Sensor node 120 may otherwise include any type of heat-sensing sensor capable of detecting and measuring heat transferred to, from, or within the monitored environment such as by thermal conduction, convection, radiation, and/or transfer of energy by phase change. The heat transfer may include, for example, that caused by an exothermic process, mass flow, volume flow, electrical energy, and the like.

In an embodiment, sensor node 120 may be positioned in or about the monitored environment to detect signals corresponding to heat transferred to, from, or within the monitored environment. In the embodiment, surveillance control system 100 may include a sensor array including one or more sensors such as sensor node 120, each positioned in or about the monitored environment to detect the signals from various perspectives with respect to the monitored environment.

In an embodiment, sensor node 120 may generate a sensor dataset for communication by data communication module 122 to surveillance control device 130 over network 102, for monitoring of the monitored environment, accordingly. In the embodiment, the sensor dataset may include signal data corresponding to signals detected by sensor node 120 in the monitored environment during an associated time period, as well as sensor identifier data for associating a position of sensor node 120 with a position in the monitored environment from which the signals of the generated sensor dataset may be detected. In the embodiment, the sensor dataset may include signal data generated by one or more sensors of the sensor array.

Surveillance control device 130 may host surveillance control program 140. Surveillance control device 130 may implement a combination of devices and technologies such as network devices and device drivers to support the operation of surveillance control program 140, and to provide a platform enabling communications between user device 110, sensor node 120, and surveillance control device 130, in accordance with embodiments of the present invention.

Surveillance control program 140 may include data communication module 142, pattern recognition module 144, event management and response module 146, training module 148, and data storage 150. Surveillance control program 140 may include an application or program such as a software program, one or more subroutines contained in a program, an application programming interface, or the like, to support communications between user device 110, sensor node 120, and surveillance control device 130, in accordance with embodiments of the present invention.

Data communication module 142 may retrieve sensor datasets from the sensor array, receive user specification data from user device 110, and communicate event response actions. Data communication module 142 may store the data in data storage 150 for retrieval and use by surveillance control program 140, in accordance with embodiments of the present invention.

Pattern recognition module 144 may detect patterns of heat transferred from a heat source with respect to positions of the heat source in the monitored environment during a first event, and further, determine expected patterns of heat to be transferred from the heat source with respect to expected positions of the heat source in the monitored environment during a second, subsequent event. The heat may be transferred from the heat source to a region or object in the monitored environment.

In an embodiment, the heat source may include, for example, a living body or creature such as an animal (e.g. human, rodent, etc.), an exothermic process (e.g. chemical reaction, fire, etc.), fluid flow (e.g. combustion gases), energized electrical equipment, and the like.

For example, the heat source may include a mobile or stationary heated mass or hot body such as a warm-blooded living body, including a rodent, person, or the like, a particular region or portion of the heated mass such as a facial region of a person, or the like. As another example, the heat source may include a hot body such as a heated volume of fluid (i.e. hot air, combustion gas, liquid, etc.). The heat source may otherwise include any heated or hot body, system, or region or part thereof from which heat may be transferred to the monitored environment, such as to a surface of the monitored environment, an object in the monitored environment, a region or volume encompassing the heat source in the monitored environment, and so on, in accordance with embodiments of the present invention. That is, the heat source may include one of a pair of systems from which heat may be transferred to the other of the pair of systems, such as may occur as a result of a temperature difference or gradient between the pair of systems.

For purposes of the present disclosure, "hot body," "heated mass," and the like refers to any body existing in the monitored environment at a temperature above an ambient temperature of a region of the monitored environment.

In an embodiment, an event may include an occurrence or period in which an environmental or contextual condition in the monitored environment corresponds to a user-defined parameter. In the embodiment, the condition may correspond to a characteristic of the heat source with respect to the monitored environment, and may include, for example, a heat transfer rate, a pattern movement rate, a pattern growth rate, a heat or temperature gradient, a temperature of an object (e.g. the heat source), and the like. The condition may otherwise include any abnormal or anomalous indication corresponding to a potential security threat or hazard with respect to the heat source in the monitored environment, in accordance with embodiments of the present invention.

Event management and response module 146 may generate a surveillance model based on an expected pattern of heat transfer, determine a threat level corresponding to a security risk posed by the heat source with respect to the monitored environment, determine whether the threat level exceeds a predetermined threshold, and perform an event response action. Event management and response module 146 may further determine heat transfer characteristics of the heat source based on the detected patterns of heat, as previously described.

In an embodiment, the surveillance model may include executable program instructions corresponding to rules for performing event response actions. An event response action may be performed according to one or more event monitoring rules, event detection rules, and/or event response rules to monitor, detect, and/or respond to events in the monitored environment with respect to the heat source, accordingly. In the embodiment, the rules may include, for example, program instructions for execution by an image capture device in monitoring the heat source during an event, program instructions for execution in controlling one or more light sources in the monitored environment with respect to the heat source during the event, program instructions for execution in triggering an alarm in response to an occurrence of the event, and the like.

For example, the alert may relate to the presence of a rodent in the monitored environment and may be communicated to user device 110 and/or a pest management authority. As another example, the alert may relate to the presence of an intruder in the monitored environment and may be communicated to user device 110 and/or a security provider, a security response system, and the like.

Training module 148 may update the surveillance model to update the rules for performing the event response actions over time. In an embodiment, a machine learning algorithm such as a multi-layer neural network may be implemented to update the surveillance model. In the embodiment, the multi-layer neural network may include a three-layer architecture having adjustable neural weights between layers of neurons. For example, the neural network may include a logistic regression-based model having regularization functionality. The surveillance model may otherwise be updated using any other technique to enable data-driven monitoring and detection of heat transfer patterns in the monitored environment, in accordance with embodiments of the present invention.

Referring now to FIG. 2A, a flowchart depicting operational steps of an aspect of surveillance control system 100 is depicted, in accordance with an embodiment of the present invention.

At Step S202, pattern recognition module 144 may detect a first pattern of heat transferred from the heat source during a first event.

In an embodiment, the first pattern of heat may be detected based on a first sensor dataset corresponding to an occurrence of a first event in the monitored environment, which may correspond to heat transferred from the heat source to the monitored environment over a period of time during the first event. For example, the first pattern of heat corresponding to an occurrence of a first event may be detected in association with a pattern of heat transferred from the heat source (e.g. a person), as well as with a pattern of movement of the heat source (e.g. movements of the person) in a region in the monitored environment. The first sensor dataset may correspond to signals detected by the sensor array during the first event. In the embodiment, the first pattern of heat may be detected with respect to a movement speed and heat spread rate in a region of the monitored environment, based on the identifiers and corresponding positions of each sensor node 120 by which the first sensor dataset may be generated. In the embodiment, a heat flux at the region of the monitored environment may be determined based on the movement speed and heat spread rate at the region encompassing the heat source in the monitored environment.

In an embodiment, the first pattern of heat transfer may be detected by implementing a background subtraction method with respect to a heat map corresponding to the first sensor dataset. For example, pattern recognition module 144 may implement a background subtraction scheme that takes a Bayesian approach to model thermal responses of pixels of an image of the monitored environment as a mixture of Gaussians with unknown number of components. The background subtraction method may include one that takes into consideration the special characteristics of thermal imagery. Pattern recognition module 144 may otherwise implement any other method to detect regions of interest in the monitored environment, in accordance with embodiments of the present invention. In the embodiment, detecting the first pattern of heat transfer may include determining a shape of the heat transfer pattern.

In an embodiment, a heat map may be generated based on the detected first pattern of heat, with respect to the movement speed and heat spread rate, the heat flux, and the like, at the region encompassing the heat source in the monitored environment. In the embodiment, the heat map may correspond to a pattern of heat transferred from a facial region of a person over a particular time period.

At Step S204, event management and response module 146 may determine an expected pattern of heat to be transferred from the heat source during a second event based on the first pattern of heat transfer.

In an embodiment, the expected pattern of heat may be determined with respect to expected positions of the heat source in the monitored environment during the second event, based on the heat transfer rate (e.g. heat flux), the pattern movement rate, the pattern growth rate, the heat or temperature gradient, and/or the temperature of the heat source during the first event. In the embodiment, the expected pattern of heat may be used to determine a corresponding expected heat movement path of the heat source during the second event.

At Step S206, event management and response module 146 may generate a surveillance model based on the expected pattern of heat during the second event.

In an embodiment, the surveillance model may be generated based on the user specification data with respect to one or more user-defined parameters (i.e. user preferences) related to event monitoring rules, event detection rules, event response rules in the monitored environment. For example, the user may suffer from a rodent problem at home that may persist while the user is away (e.g. on vacation). While the rodent problem may not pose a security risk, the system may control the cameras in order to capture what and where the rodent is as well as to notify the owner or company that is supporting the owner for such rodent. Further, the user-defined parameters may indicate "allowed" heat sources in the monitored environment to be ignored, such as people and pets in the monitored environment, or heat sources with heat transfer rates below a user-specified threshold.

In an embodiment, the surveillance model may be generated by determining a heat transfer characteristic of the heat source based on the first and second sensor datasets and the second pattern of heat transfer. In the embodiment, the expected pattern of heat transfer may be classified with respect to a class of heat transfer patterns based on the heat emission characteristic, where the class of heat transfer patterns includes one or more modeled heat transfer patterns corresponding to a recurring pattern of heat transferred to the surveillance environment. In the embodiment, the surveillance model may be generated with respect to the class of heat emission patterns.

In an embodiment, the surveillance model may be updated by determining a significant heat transfer mode (i.e. conductive, convective, radiative, phase change) of the observed pattern of heat transfer. In the embodiment, the determined heat transfer mode may be classified with respect to a class of security threats.

At Step S208, pattern recognition module 144 may detect a second pattern of heat transferred from the heat source.

The second pattern may correspond to an observed pattern of heat transferred from the heat source during the second event.

In an embodiment, the second pattern of heat may be detected based on a second sensor dataset corresponding to an occurrence of a second, subsequent event in the monitored environment, which may correspond to heat transferred from the heat source to the monitored environment over a period of time during the second event. The second sensor dataset may correspond to signals detected by the sensor array during the second event, such as in the same manner as that detected during the first event, as previously described with reference to Step S202. In the embodiment, the second pattern of heat may be detected in the same manner as the first pattern of heat, as described with reference to Step S202.

At Step S210, event management and response module 146 may monitor or continuously detect the heat source during the second event with respect to the second pattern of heat transfer.

In an embodiment, the heat source may be monitored by execution of the program instructions of the surveillance model (generated at Step S206) by an image capture device in the monitored environment with respect to the second pattern of heat transfer (detected at Step S208), to track, or to otherwise locate, position, and focus the heat source within a field-of-view of the device. In the embodiment, the program instructions may additionally or alternatively be executed to control energization of a light source to illuminate a region of the monitored environment with respect to the field-of-view of the device and/or the positions of the heat source in the monitored environment. The instructions for performing the actions may otherwise include instructions for increasing visualization clarity of the heat source as monitored by the image capture device, in accordance with embodiments of the present invention. The field-of-view of the device may include, for example, the extent of the observable world that is "seen" by the device at any given moment, and may depend on the solid angle through which the device is sensitive to electromagnetic radiation.

At Step S212, event management and response module 146 may determine a threat level corresponding to a security risk posed by the heat source with respect to the monitored environment.

In an embodiment, the threat level and the security risk may be determined based on a deviation between the expected pattern and the second (i.e. observed) pattern of heat transfer during the second event, with respect to differences in the static and dynamic features of the expected and second patterns of heat transfer.

In an embodiment, the threat level and the security risk may be determined based on a determination of mental state of the heat source. In the embodiment, the mental state may be determined based on the deviation between the expected and second patterns of heat transfer. For example, the change in mental state may correspond to a change in heat emitted from the heat source (e.g. of a person). In the embodiment, a comparison of the changes may be made based on corresponding heat maps of the detect patterns of heat transfer.

At Step S214, event management and response module 146 may determine that the threat level exceeds a predetermined threshold. If the threat level does not exceed the predetermined threshold, the method proceeds to Step S210. If the threat level exceeds the predetermined threshold, the method proceeds to Step S216. The predetermined threshold may be chosen as a matter of design, in accordance with embodiments of the present invention.

At Step S216, event management and response module 146 may perform an event response action, as previously described with reference to event management and response module 146 in the description of FIG. 1. In an embodiment, the event response action may be performed based on the threat level corresponding security risk as determined at Step S212.

Figure 2B:
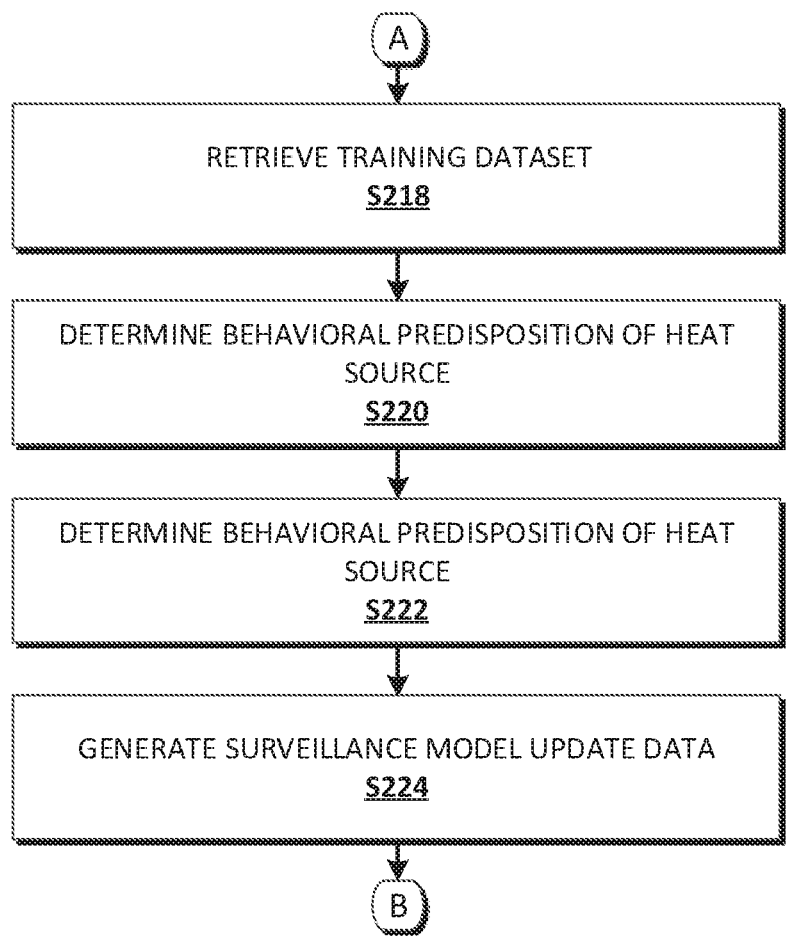
FIG. 2B is a flowchart depicting operational steps of an aspect of the surveillance control system, in accordance with an embodiment of the present invention.

Referring now to FIG. 2B, a flowchart depicting operational steps of an aspect of surveillance control system 100 is depicted, in accordance with an embodiment of the present invention.

At step S218, training module 148 may retrieve a training dataset including historical behavioral characteristics data corresponding to behavioral characteristics of historical occupants of the monitored environment.

In an embodiment, the training dataset may include data corresponding to the monitored heat source (at Step S210). For example, the training dataset may include data corresponding to mood and cognitive state of the historical occupants, times of occupation by the historical occupants in the monitored environment, schedules and calendar activities associated with the historical occupants, detected conversations, geo-spatial metrics, and heat transfer patterns. The conversations may be detected by implementing a natural language processing (NLP) technique.

At step S220, training module 148 may determine a historical behavioral predisposition of each historical occupant based on the historical behavioral characteristics data.

In an embodiment, the machine learning algorithm may be implemented to determine the historical behavioral predisposition of each historical occupant. For example, the multi-layer neural network may include a three-layer architecture having adjustable neural weights between layers of neurons that may cluster the historical behavioral predispositions of each historical occupant based on cognitive state. Feedback may be generated in conjunction with re-configurable neural weights assigned for assignment to the neural weights with respect to the user specification data.

At step S222, training module 148 may determine a behavioral predisposition of the heat source by classification with respect to the historical behavioral predisposition of each historical occupant.

In an embodiment, the behavioral predisposition of the heat source may be determined with a level of confidence by classification with respect to the clustered historical behavioral predispositions of each historical occupant (at Step S220). For example, the real-time interaction and engagement patterns and sequences of the heat source may be classified with respect to the clustered historical occupants by analyzing a plurality of historical occupant activities such as conversations and control of certain objects in the monitored environment.

At step S224, training module 148 may generate surveillance model update data based on the classification.

In an embodiment, the machine learning algorithm may be executed based on sensor datasets corresponding to respective events in the monitored environment. In the embodiment, the update may include updated program instructions for updating the surveillance model (generated at Step S206). The updates may be applied to remove the false positives and true negatives that would otherwise be detected by way of the image capture devices in the monitored environment based on the detected patterns of heat.

As an implementation example, an algorithmic approach may include the following steps: 1) For each User Ui in the current detected list of users U, Get Ui characteristics: tone t, personality p, language expression l, facial gestures g, body gesture/action b, Ui(t, p, l, g, b); 2) analyze Ui (t, p, l, g, b) to determine cognitive state and behavior Ui(cs, be); 3) if Ui(cs, be) surpass an initial threshold time t_w, a monitoring session is started for Ui and cohorts; 4) for each history record Ui_Hi in Ui_H, If Ui_Hi contains an old user cognitive state behavior Ui(cs, be) that triggered a feedback to the system that is similar to the current Ui(cs, be), then a cluster monitoring session is started for Ui and cohorts; 5) Continuously monitor Ui and cohorts. Get Ui characteristics: tone t, personality p, language expression l, facial gestures f, body gesture/action b, Ui(t, p, l, g, b); 6) change configuration on components; 7) measure Ui reactions to change based on changes in heat transfer patterns; 8) determine, for each clustering action P_Ai, whether each contains a set of machine comprehensible actions, a duration, a prioritization, and a set of user cognitive states and behaviors Ux(cs, be) for which the P_Ai is recommended; 9) set the order of clustering action in which to minimize effect on usage; 10) select P_Ai according to the current Ui(cs, be) and priority P_Ai_p; 11) after P_Ai execution duration, monitoring session continues; 12) if Ui(cs, be) is below warning threshold for a configured amount of time, the monitoring session is finished; and 13) save Ui_H for future reference.

Figure 3:
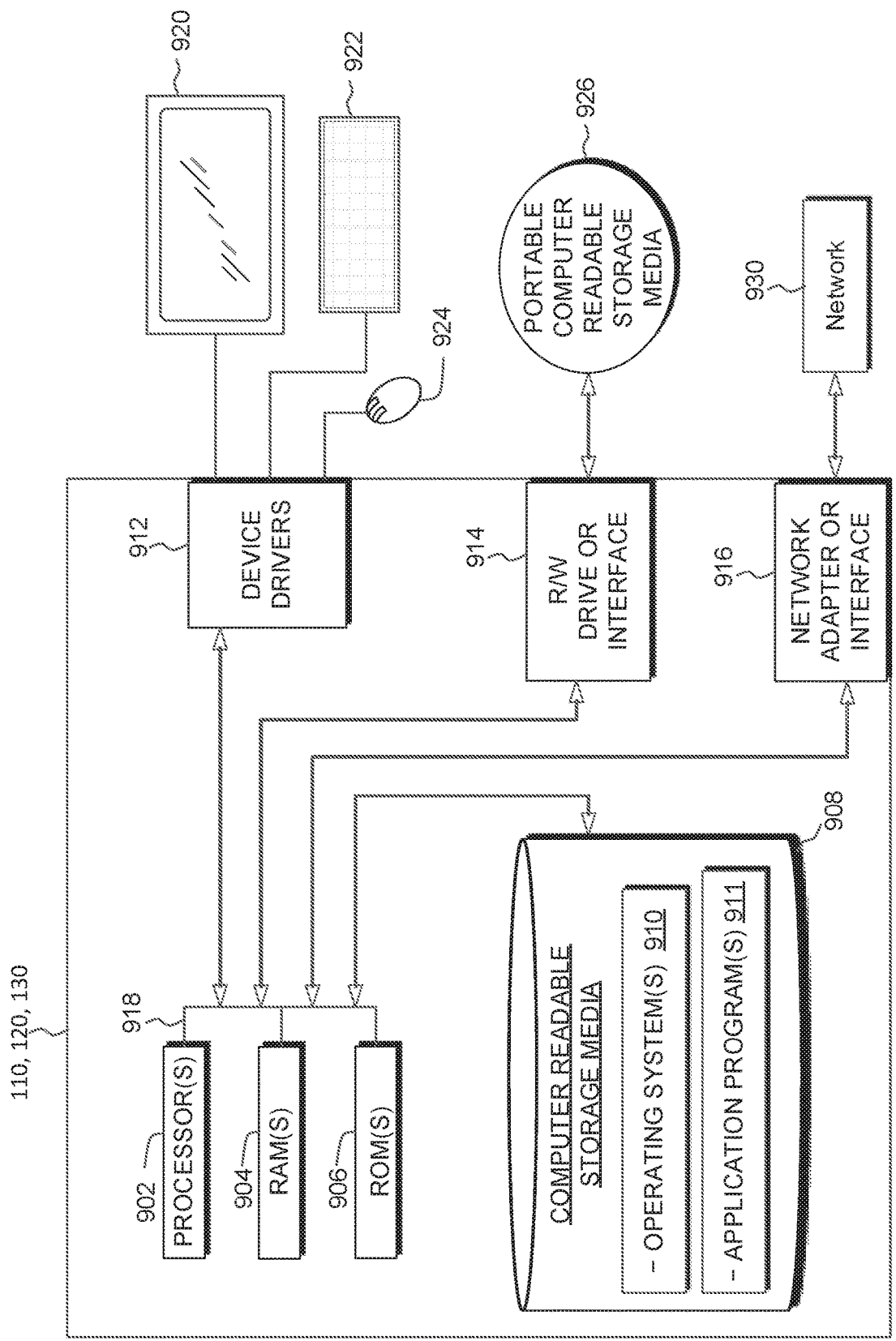
FIG. 3 is a block diagram depicting a user device, a sensor node, and/or a surveillance control device, in accordance with an embodiment of the present invention.

FIG. 3 is a block diagram depicting user device 110, sensor node 120, and/or surveillance control device 130, in accordance with an embodiment of the present invention.

As depicted in FIG. 3, user device 110, sensor node 120, and/or surveillance control device 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as surveillance control program 140 residing on surveillance control device 130, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User device 110, sensor node 120, and/or surveillance control device 130 may also include a R/W drive or interface 914 to read from and write to one or more portable computer readable storage media 926. Application programs 911 on user device 110, sensor node 120, and/or surveillance control device 130 may be stored on one or more of the portable computer readable storage media 926, read via the respective R/W drive or interface 914 and loaded into the respective computer readable storage media 908. User device 110, sensor node 120, and/or surveillance control device 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. User device 110, sensor node 120, and/or surveillance control device 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

User device 110, sensor node 120, and/or surveillance control device 130 can be a standalone network server, or represent functionality integrated into one or more network systems. In general, user device 110, sensor node 120, and/or surveillance control device 130 can be a laptop computer, desktop computer, specialized computer server, or any other computer system known in the art. In certain embodiments, user device 110, sensor node 120, and/or surveillance control device 130 represents computer systems utilizing clustered computers and components to act as a single pool of seamless resources when accessed through a network, such as a LAN, WAN, or a combination of the two. This implementation may be preferred for data centers and for cloud computing applications. In general, user device 110, sensor node 120, and/or surveillance control device 130 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
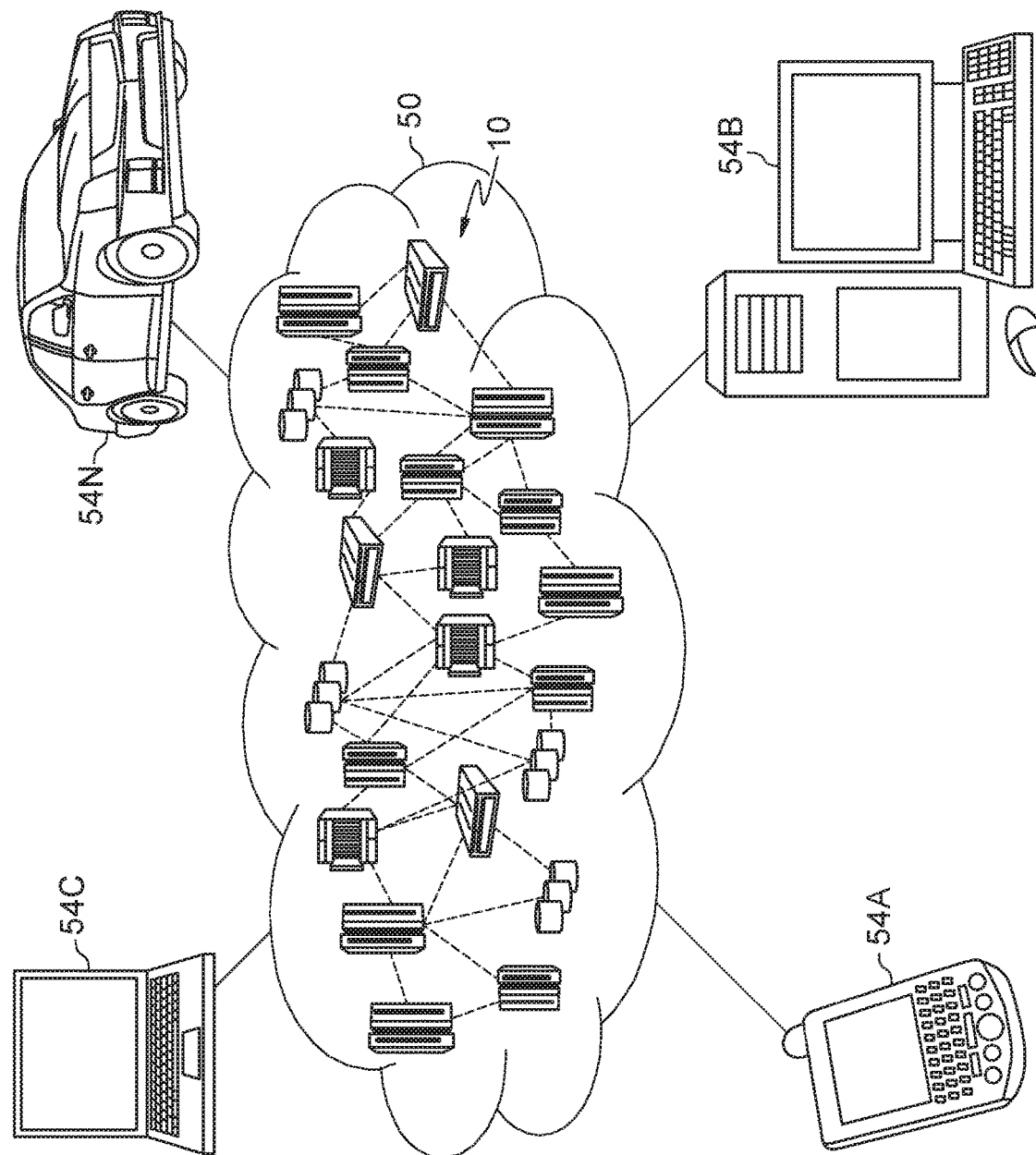
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
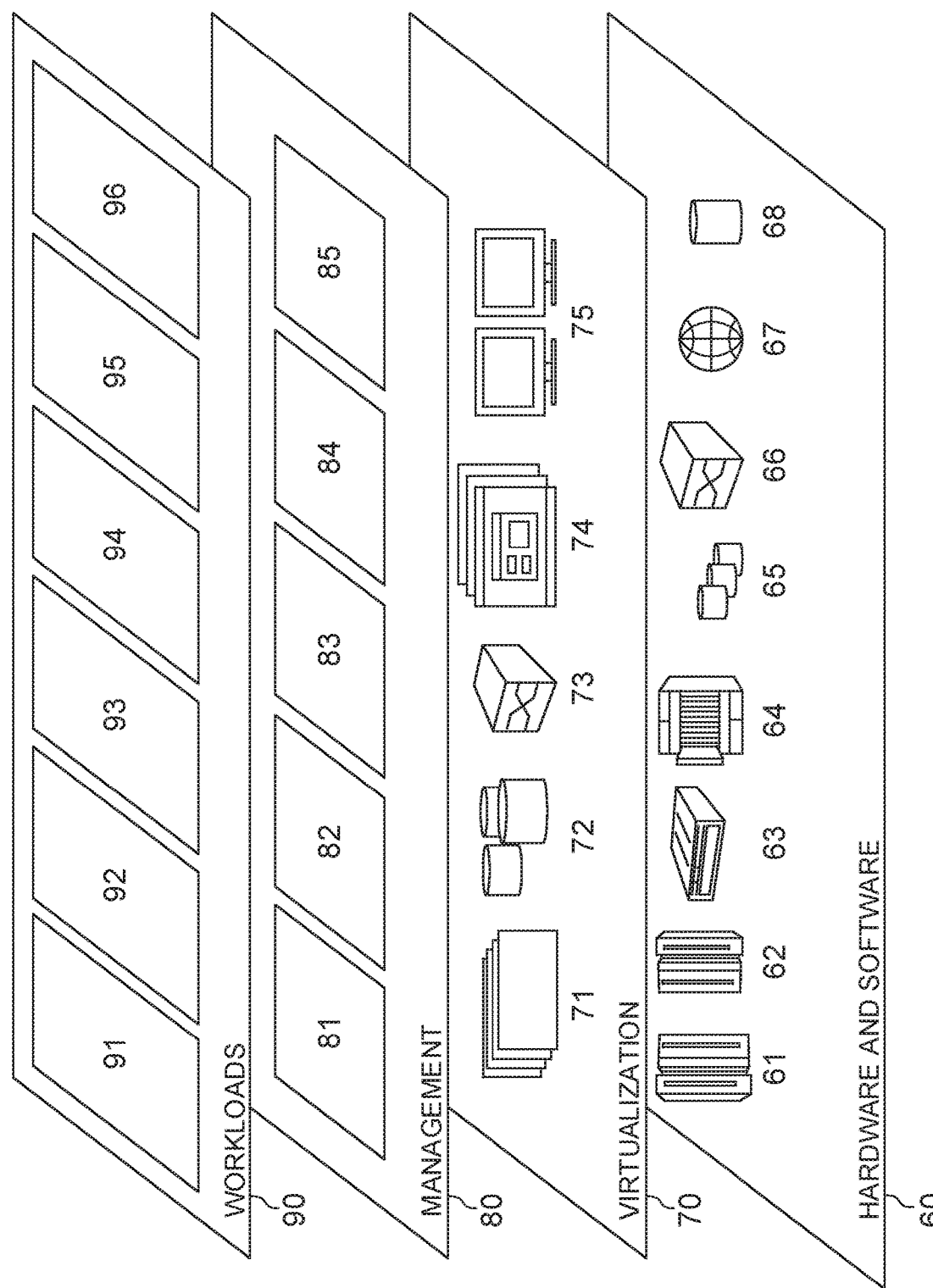
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and heat-based surveillance controlling 96. Heat-based surveillance controlling 96 may include functionality enabling the cloud computing environment to perform heat-based surveillance control, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for heat-based control of a surveillance system, wherein the surveillance system is configured to monitor events in a surveillance environment, the method comprising:
    detecting a first pattern of heat transferred from a heat source based on a first sensor dataset corresponding to a first event;
    determining an expected pattern of heat to be transferred from the heat source during a second event based on the first pattern of heat;
    generating a surveillance model based on the expected pattern of heat;
    detecting a second pattern of heat transferred from the heat source based on a second sensor dataset during the second event;
    tracking the heat source during the second event via an image capture device, the heat source being tracked within a field of view of the image capture device, the tracking comprising focusing, zooming, and/or panning of the image capture device, the surveillance model controlling the focusing, the zooming, and/or the panning;
    determining a threat level corresponding to a security risk posed by the heat source with respect to the surveillance environment, wherein the threat level is determined with respect to a deviation between the expected pattern and the second pattern of heat;
    determining a heat transfer mode of the first and second patterns of heat, wherein the first and the second sensor datasets are received from a sensor array located in the surveillance environment, wherein the sensor array is configured to determine if the heat transfer mode of the first pattern of heat and of the second pattern of heat occurs via thermal conduction, wherein the sensor array is configured to determine if the heat transfer mode of the first pattern of heat and of the second pattern of heat occurs via convection, wherein the sensor array is configured to determine if the heat transfer mode of the first pattern of heat and of the second pattern of heat occurs via radiation, and wherein the sensor array is configured to determine if the heat transfer mode of the first pattern of heat and of the second pattern of heat occurs via a transfer of energy by a phase change;
    classifying the heat source with respect to a class of security threats based on the heat transfer mode; and
    updating the surveillance model based on the classifying of the heat source with respect to the class of security threats.

2. The computer-implemented method of claim 1, further comprising:
    in response to determining that the threat level exceeds a predetermined threshold:
    performing an event response action.

3. The computer-implemented method of claim 1, further comprising:
    updating event response rules of the surveillance model based on the classifying of the heat source with respect to the class of security threats; and
    in response to determining that the threat level exceeds a predetermined threshold, performing an event response action based on the event response rules.

4. The computer-implemented method of claim 3, wherein the threat level is determined based on the heat transfer characteristic and the heat transfer mode.

5. The computer-implemented method of claim 1, wherein the first and second sensor datasets comprise thermal imaging data.

6. The computer-implemented method of claim 1, wherein the sensor array comprises a thermal imaging device and an optical imaging device.

7. The computer-implemented method of claim 1, further comprising:
    determining an expected heat flux from the heat source based on the expected pattern of heat.

8. The computer-implemented method of claim 7, wherein the deviation corresponds to a difference between the expected heat flux and an observed heat flux from the heat source during the second event.

9. The computer-implemented method of claim 1, further comprising:
    retrieving historical behavioral characteristics data corresponding to behavioral characteristics of historical occupants of the surveillance environment;
    determining a behavioral predisposition of each historical occupant based on the historical behavioral characteristics data;
    monitoring an activity of the heat source during the second event with respect to the behavioral predispositions of the historical occupants;
    determining a behavioral characteristic of the heat source based on the activity;
    determining a behavioral predisposition of the heat source based on a behavioral characteristic;
    classifying the behavioral predisposition with respect to a class of behavioral predispositions based on the behavioral characteristic, wherein the class of behavioral predispositions comprises a modeled behavioral predisposition corresponding to actions of a regular occupant of the surveillance environment; and
    updating the surveillance model based on the classifying of the behavioral predisposition.

10. The computer-implemented method of claim 9, wherein the actions comprise:
    interactions between the heat source and an object and/or
    a series of gestures exhibited by the heat source.

11. A computer system for heat-based control of a surveillance system, wherein the surveillance system is configured to monitor events in a surveillance environment, the computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
detecting a first pattern of heat transferred from a heat source based on a first sensor dataset corresponding to a first event;
determining an expected pattern of heat to be transferred from the heat source during a second event based on the first pattern of heat;
generating a surveillance model based on the expected pattern of heat;
detecting a second pattern of heat transferred from the heat source based on a second sensor dataset during the second event;
tracking the heat source during the second event via an image capture device, the heat source being tracked within a field of view of the image capture device, the tracking comprising focusing, zooming, and/or panning of the image capture device, the surveillance model controlling the focusing, the zooming, and/or the panning;
determining a threat level corresponding to a security risk posed by the heat source with respect to the surveillance environment, wherein the threat level is determined with respect to a deviation between the expected pattern and the second pattern of heat;
determining a heat transfer mode of the first and second patterns of heat, wherein the first and the second sensor datasets are received from a sensor array located in the surveillance environment, wherein the sensor array is configured to determine if the heat transfer mode of the first pattern of heat and of the second pattern of heat occurs via thermal conduction, wherein the sensor array is configured to determine if the heat transfer mode of the first pattern of heat and of the second pattern of heat occurs via convection, wherein the sensor array is configured to determine if the heat transfer mode of the first pattern of heat and of the second pattern of heat occurs via radiation, and wherein the sensor array is configured to determine if the heat transfer mode of the first pattern of heat and of the second pattern of heat occurs via a transfer of energy by a phase change;
classifying the heat source with respect to a class of security threats based on the heat transfer mode; and
updating the surveillance model based on the classifying of the heat source with respect to the class of security threats.

12. The computer system of claim 11, further comprising:
in response to determining that the threat level exceeds a predetermined threshold:
performing an event response action.

13. The computer system of claim 11, further comprising:
updating event response rules of the surveillance model based on the classifying of the heat source with respect to the class of security threats; and
in response to determining that the threat level exceeds a predetermined threshold, performing an event response action based on the event response rules.

14. A computer program product for heat-based control of a surveillance system, wherein the surveillance system is configured to monitor events in a surveillance environment, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
detecting a first pattern of heat transferred from a heat source based on a first sensor dataset corresponding to a first event;
determining an expected pattern of heat to be transferred from the heat source during a second event based on the first pattern of heat;
generating a surveillance model based on the expected pattern of heat;
detecting a second pattern of heat transferred from the heat source based on a second sensor dataset during the second event;
tracking the heat source during the second event via an image capture device, the heat source being tracked within a field of view of the image capture device, the tracking comprising focusing, zooming, and/or panning of the image capture device, the surveillance model controlling the focusing, the zooming, and/or the panning;
determining a threat level corresponding to a security risk posed by the heat source with respect to the surveillance environment, wherein the threat level is determined with respect to a deviation between the expected pattern and the second pattern of heat;
determining a heat transfer mode of the first and second patterns of heat, wherein the first and the second sensor datasets are received from a sensor array located in the surveillance environment, wherein the sensor array is configured to determine if the heat transfer mode of the first pattern of heat and of the second pattern of heat occurs via thermal conduction, wherein the sensor array is configured to determine if the heat transfer mode of the first pattern of heat and of the second pattern of heat occurs via convection, wherein the sensor array is configured to determine if the heat transfer mode of the first pattern of heat and of the second pattern of heat occurs via radiation, and wherein the sensor array is configured to determine if the heat transfer mode of the first pattern of heat and of the second pattern of heat occurs via a transfer of energy by a phase change;
classifying the heat source with respect to a class of security threats based on the heat transfer mode; and
updating the surveillance model based on the classifying of the heat source with respect to the class of security threats.

15. The computer-implemented method of claim 1, wherein the heat source is selected from the group consisting of a person and an animal.

16. The computer-implemented method claim 15, wherein the first pattern of heat and the second pattern of heat are detected from a facial region of the person or of the animal.

17. The computer-implemented method of claim 1, wherein the surveillance model further controls energization of a light source to illuminate at least one position of the heat source in the surveillance environment.

18. The computer-implemented method of claim 1, further comprising:

retrieving historical behavioral characteristics data of historical occupants of the surveillance environment, wherein the historical behavioral characteristics data comprises times of occupation by the historical occupants in the surveillance environment and/or schedules and calendar activities associated with the historical occupants;

monitoring an activity of the heat source during the second event with respect to the historical behavioral characteristics data;

classifying a behavioral predisposition of the heat source with respect to the historical behavioral characteristics data; and updating the surveillance model based on the classifying of the behavioral predisposition with respect to the historical behavioral characteristics data.

19. The computer-implemented method of claim 1, wherein the heat source is a rodent; and wherein the method further comprises:

in response to determining that the threat level exceeds a predetermined threshold, generating an alert and communicating the alert to a pest management authority.

20. The computer-implemented method of claim 1, wherein the first pattern of heat is detected by implementing a background subtraction method with respect to a heat map corresponding to the first sensor dataset.

* * * * *